(12) United States Patent
Ouyang et al.

(10) Patent No.: US 6,614,442 B1
(45) Date of Patent: Sep. 2, 2003

(54) MACROBLOCK TILING FORMAT FOR MOTION COMPENSATION

(75) Inventors: Chi Ouyang, Fremont, CA (US); Derek B. Noonburg, San Jose, CA (US)

(73) Assignee: S3 Graphics Co., Ltd., Grand Cayman (KN)

( * ) Notice: Subject to any disclaimer, the term of this patent is extended or adjusted under 35 U.S.C. 154(b) by 309 days.

(21) Appl. No.: 09/604,550

(22) Filed: Jun. 26, 2000

(51) Int. Cl.⁷ .................................................. G06T 17/00

(52) U.S. Cl. ...................................................... 345/545

(58) Field of Search ................................ 345/545, 590, 345/591, 593, 594, 604, 605

(56) References Cited

U.S. PATENT DOCUMENTS 6,014,416 A * 1/2000 Shin et al. .................. 375/368
6,292,194 B1 * 9/2001 Powell, III .................. 345/582

* cited by examiner

*Primary Examiner*—Cliff N. Vo
(74) *Attorney, Agent, or Firm*—Carr & Ferrell LLP

(57) ABSTRACT

A macroblock tiling format method and system for implementing the method during an MPEG decoding process is disclosed. The macroblock tiling format groups picture data samples into tiles, each tile including a combination of luminance and/or chrominance data samples corresponding to a given number of macroblocks. Picture data samples in a tile is mapped to memory locations within a single memory page of a buffer memory which temporarily stores decoded pictures.

8 Claims, 16 Drawing Sheets

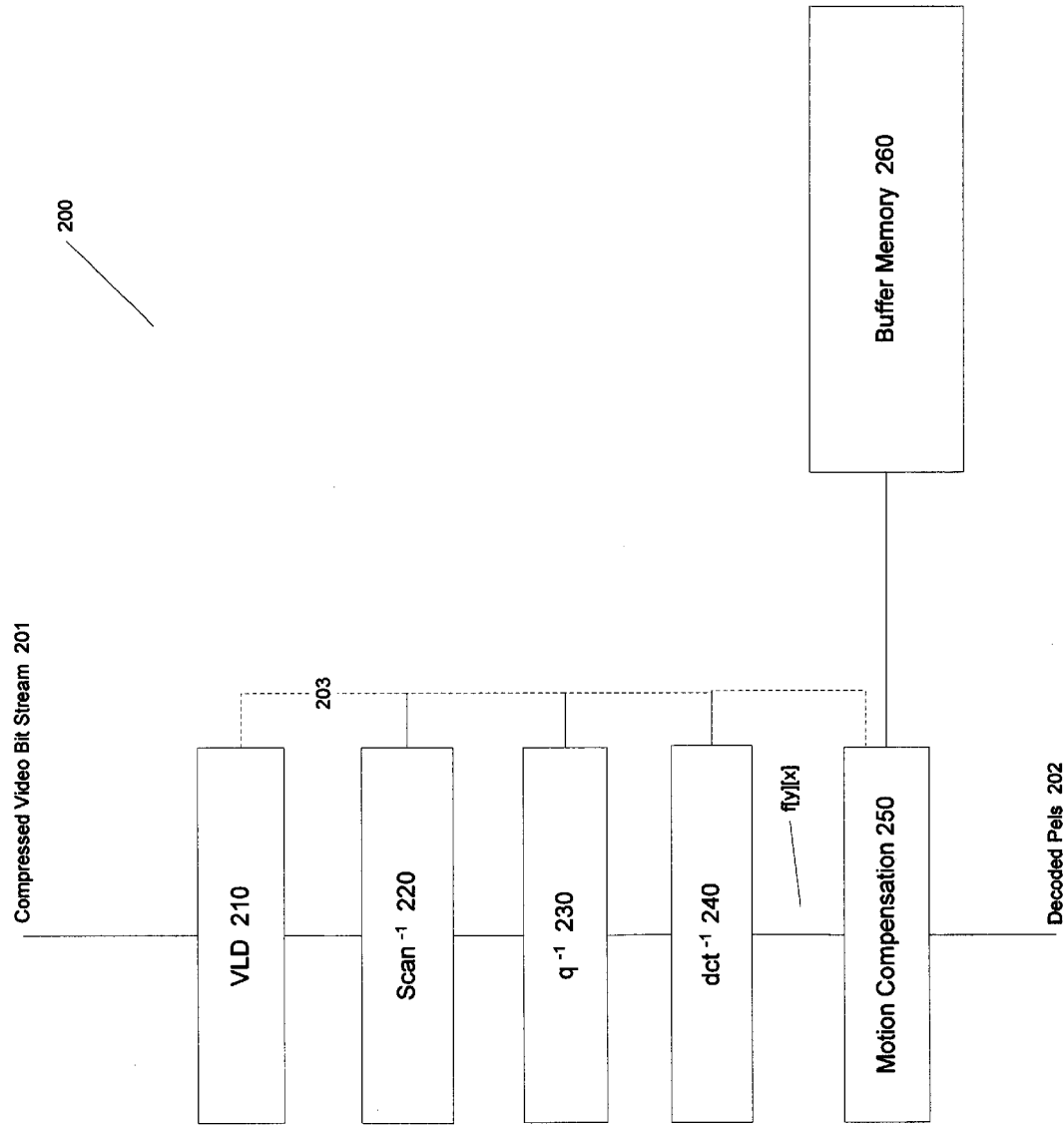

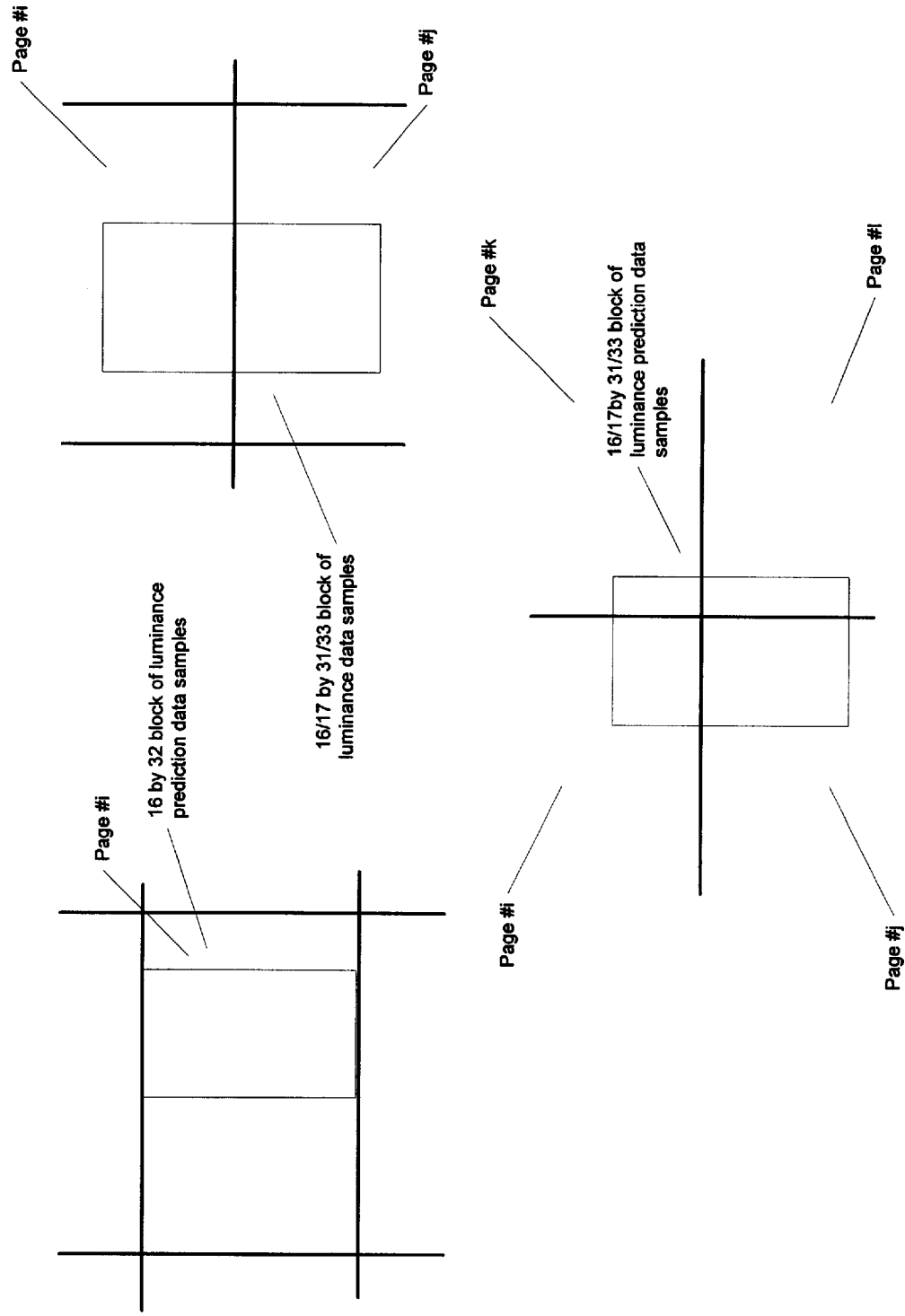

MACROBLOCK TILING FORMAT FOR MOTION COMPENSATION

BACKGROUND

1. Field of the Invention

This invention relates generally to digital video processing, and particularly to the process of using motion compensation to reconstruct a compressed video bit stream.

2. Background of the Invention

Video and audio data, if not compressed, are usually too large for storage and network communications. Modem video compression mixes several techniques to achieve compression ratios of hundreds to one. MPEG (which stands for the Moving Picture Experts Group) is a committee working under the joint direction of the International Standards Organization (ISO) and the International Electro-Technical Commission (IEC) and has developed multiple standards for encoding video and accompanying audio data. Over the years MPEG standards have progressed through several levels with increasing sophistication and quality.

Video compression relies upon the human eye's inability to resolve high frequency color changes, and the fact that there is a lot of redundancy within each picture and between pictures in the video. MPEG achieves high compression rate by compressing the pictures in the time dimension, and encoding only the changes from one picture to another, instead of each entire picture of a series of pictures in a video. The techniques of using past and/or future pictures to compensate for part of a current picture in a compressed video is called motion compensation.

For purposes of motion compensation, MPEG typically defines three main types of pictures, which are "intra coded," "predictive coded" and "bi-directional predictive coded" pictures. Intra coded pictures (or "I-pictures") are coded without reference to other pictures and with only moderate compression. A predictive coded picture (or "P-picture") is coded more efficiently using motion compensated prediction from a past intra or predictive coded picture, and is generally used as a reference for further prediction. Bi-directionally-predictive coded pictures ("B-pictures") provide the highest degree of compression but require use of both past and future reference pictures for motion compensation.

A compressed MPEG video typically includes groups of I-pictures, B-pictures and P-pictures. Each group of I-pictures, B-pictures and P-pictures is known as a Group of Pictures (GOP). FIG. 1 is a diagram of an example of such a GOP comprising an I-picture 110, two P-pictures 120 and 121, and five B-pictures 130, 131, 132, 133 and 134, and the relationship among the three different picture types as conventionally known. The I-picture 110 includes full picture information and has relatively the least amount of compression. The P-picture 120 is predicted from the I-picture 110, and the P-picture 121 is predicted from the P-picture 120. The B-picture 130 uses the past I-picture 110 and the future P-picture 120 as references, and the B-picture 132 uses the past P-picture 120 and the future P-picture 121 as references.

When a picture is to be coded such as an I-picture, the picture is first divided into a plurality of non-overlapping macroblocks. Typically, each of the macroblocks corresponds to a 16×16 pixel area in the picture. If the picture is represented by three color planes, a red plane, a green plane and a blue plane, the RGB data in each macroblock is converted into a set of Y, Cr and Cb data. The Y or luminance data quantifies the overall brightness of the pixels in the macroblock, and is derived by totaling together all three of the RGB data. The Cr and Cb data are color difference data.

There are typically three chrominance formats for a macroblock, namely 4:2:0, 4:2:2 and 4:4:4. When the 4:2:0 format is used, a macroblock includes four 8×8 Y blocks, one 8×8 Cr block and one 8×8 Cb block. For each 8×8 block, the Discrete Cosine Transform (DCT) is used, along with other encoding procedures including quantization and variable length coding (VLC). A macroblock thus coded is called an intra coded macroblock.

A P-picture, such as the P-picture 120 in FIG. 1, is encoded by reusing part of the data contained in the previous I-picture 110. Each macroblock in the uncompressed P-picture 120, called a "target block," is compared to areas of a similar size from the uncompressed I-picture 110 in order to find an area or a "matching block" that is similar. Sometimes, the matching block happens to be in the same location in the past frame as the target block is in the current frame, and there is no difference (or the difference is negligible) between the target block and the matching block. In this situation, the target block may not be coded at all and is called a skipped macroblock. More often, the matching block is in a different location and/or there is some difference between the target block and the matching block. In this situation, only the difference between the target block and the matching block is encoded, and a motion vector, which indicates the relative difference in location between the target block and the matching block, is constructed and encoded in place of the data shared by the target block and the matching block. Because much less bits are required to code the motion vector than to code the video data shared by the target block and the matching block, compression is achieved.

A B-picture is coded by reusing data from both a past picture and a future picture. A macroblock of a B-picture may use matching macroblocks from both a past reference picture and a future reference picture. Because information that is not to be found in the past picture might be found in the future picture, bi-directional motion compensation is much more effective than compression that uses only a single past picture, and allows more macroblocks to be replaced by motion vectors. A macroblock coded by referencing data in past and/or future pictures is called a non-intra coded or inter coded macroblock.

If no matching block for a macroblock in a uncompressed P-picture or B-picture can be found in the reference pictures, the macroblock can not be motion compensated and will be coded as an intra coded macroblock.

An MPEG compressed video bit stream (VBS) needs to be decoded before it is ready for display. The I-pictures in the VBS can be decoded without reference to any of the other pictures in the VBS. However, a B-pictures or P-picture in the VBS can only be reconstructed by using data from the relevant parts of past and/or future pictures. Because a coded B-picture may contain motion vectors pointing to matching blocks in both a past I-picture or P-picture and a future I-picture or P-picture, these past and future I-picture or P-pictures have to be decoded and stored before the coded B-picture is decoded. Therefore, Bi-directional motion compensation requires that pictures in a video be transmitted in a different order from which they will be displayed.

Frame buffers are usually used by an MPEG compliant decoding process, to store decoded I-picture and/or P-picture, until all of the pictures depending on the I-picture and/or P-picture for motion compensation are reconstructed. For example, when a inter coded macroblock in a P-picture is being decoded, prediction data associated with a matching block in a decoded previous I-picture or P-picture, as pointed by the motion vector associated with the Inter-coded macroblock, will be fetched from a frame buffer, and be used to reconstruct the Inter-coded macroblock.

Traditionally, an MPEG decoded picture represented by three planes, a luminance (Y) plane and two chrominance (Cb and Cr) planes, is typically stored in planar mode in which pixel data within each plane are stored in raster scan order. However, motion compensation is operated on macroblock basis, so that data is read from or written to a frame buffer in blocks. As a result of this inconsistency, many page breaks will be encountered when data corresponding to a matching block are read from the frame buffer and when a decoded macroblock is written into the frame buffer. When the 4:2:0 format is used, the luminance plane of a picture is typically stored in a separate memory space from the chrominance planes. To store in planar mode a decoded CCIR 601 frame in 4:2:0 format having standard resolution of 720×480, assuming that each luminance data sample occupies 1 byte of memory in the frame buffer, and that the frame buffer is made of DRAMs with 2 kilo byte pages, the luminance data samples corresponding to roughly every three scan lines of pixels have to be stored in a separate page in the frame buffer. In this situation, as shown in FIG. 1B, luminance data samples corresponding to a 16×16 block 150 is typically split into 6 different memory pages, which are pages 160a–f of the frame buffer. Therefore, to reconstruct the luminance component of a 16×16 macroblock in a frame picture using motion compensation having one directional prediction, at least 10 page breaks will be encountered in performing the operations of reading a matching block from the frame buffer and writing the reconstructed data samples to a frame buffer. The delay involved in waiting for the memory to fetch a new page cause inefficiency in using the memory bandwidth and latency in transferring data to and from the frame buffers.

Thus, there is a need for an apparatus and method for improving memory bandwidth efficiency when MPEG motion compensation is performed, and that can overcome the above-mentioned deficiencies of conventional approaches.

SUMMARY OF THE INVENTIONS

The above needs are met by a method and system that map a decoded picture into memory addresses in a buffer memory using a set of address mapping methods called macroblock tiling format.

In one aspect of the present invention, the data samples representing a picture are grouped into a number of tiles. Each tile is stored in a single memory page in the buffer memory. Data samples in each tile may be luminance data samples corresponding to a given number of macroblocks, or chrominance data samples corresponding to a given number of macroblocks, or a combination of luminance and chrominance data samples corresponding to a given number of macroblocks.

In one embodiment of the present invention, an address generator generates memory addresses for fetching prediction data from the buffer memory and for writing a decoded macroblock into the buffer memory, based on the macroblock tile format address mapping methods.

BRIEF DESCRIPTION OF THE DRAWINGS

FIG. 2A is a flow chart illustrating an overview of a video decoding system in accordance with an embodiment of the present invention.

FIG. 6C is a block diagram showing a 16 or 17 by 31 or 33 block of luminance prediction data samples falling across 1, 2, or 4 memory pages.

DETAILED DESCRIPTION OF THE PREFERRED EMBODIMENTS

The following detailed description is based upon the ISO/IEC International Standard 13818-2 and includes numerous specific details about encoded video bit streams and decoding methods, in order to provide a thorough understanding of the present invention. However, it will be understood by those skilled in the art that the present invention may be practiced outside of the ISO/IEC International Standard 13818-2 and/or without these specific details. In other instances, methods, procedures and components well known to those skilled in the art have not been described in detail so as not to obscure aspects of the present invention.

Figure 2B:
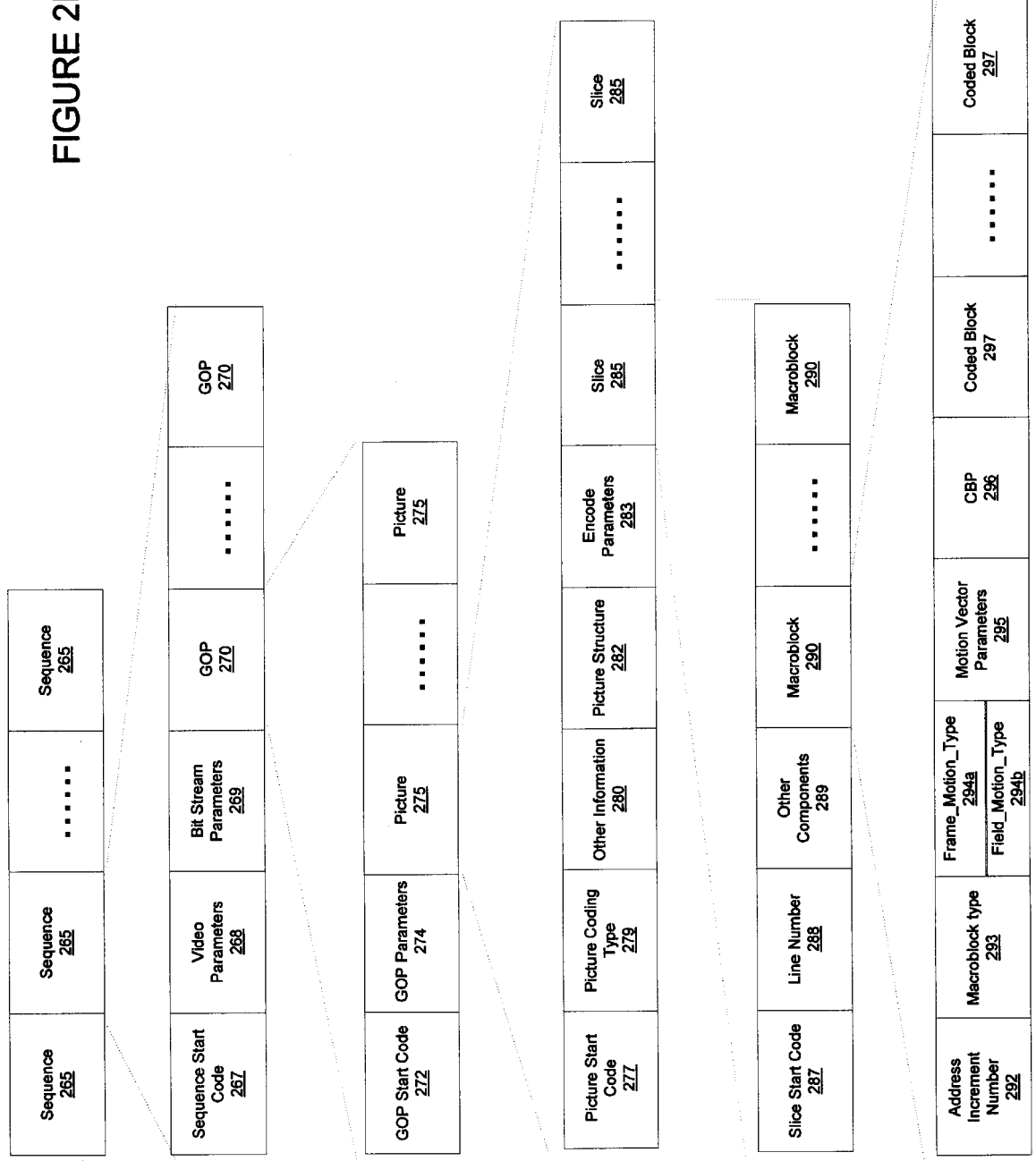
FIG. 2B is a block diagram of a structure of a video bit stream in accordance with an embodiment of the present invention.

FIG. 2A is a diagram illustrating an overview of an example of a decoding system 200 conforming with the ISO/IEC International Standard 13818-2, and in accordance with an embodiment of the present invention. The decoding system 200 transforms a compressed video bit stream 201 back into a displayable video containing a series of pixel data samples (Pels) 202. The decoding system 200 includes a variable length decoding (VLD) module 210, an inverse scan (Scan$^{-1}$) module 220, inverse quantization (q$^{-1}$) module 230, an inverse discrete cosine transformation (dct$^{-1}$) module 240 and a motion compensation (MC) module 250. The motion compensation module 250 makes use of a buffer memory 260, which includes spaces that can be configured to store multiple decoded pictures. The decoding system 200 can be implemented either in hardware or in software run by a CPU in connection with a system memory.

In one embodiment of the present invention, the input video bit stream 201 is compressed from an original video using a set of procedures, including discrete cosine transform, quantization, variable length coding and motion compensation, that complies with the ISO/IEC International Standard 13818-2. In general, the video bit stream 201 can be thought of as a syntactic hierarchy in which syntactic structures contain one or more subordinate structures. As shown, for example, in FIG. 2B, the video bit stream 201 includes a series of video sequences 265, which are the highest syntactic structure of the video bit stream 201. Each video sequence 265 commences with a sequence header including information such as a sequence start code 267 for delineating a boundary between two consecutive sequences, a set of video parameters 268 such as width, height, aspect ratio of pixels and picture, a set of bitstream parameters 269 such as bit rate, buffer size and constrained parameters flag. A sequence 265 also includes a series of picture structures (GOP 270). Each GOP 270 may start with a GOP header including a GOP start code 272 for delineating a boundary between two consecutive GOPs, and a set of GOP parameters 274 including bits describing the structure of the GOP 270.

The GOP header is followed by picture structures. Each picture structure 275 is headed with a picture header which includes coded information including a picture start code 277 for delineating a boundary between two consecutive picture structures, and a picture coding type 279 indicating whether the picture is an I-picture, P-picture or B-picture and other information 280 related to the coded picture. The picture header is followed by a picture coding extension 281 including coded information of a picture structure 282 indicating whether the picture is a frame picture or a top or bottom field picture, and a set of encode parameters 283 indicating whether half pixel motion vectors should be used.

The picture coding extension 281 of a picture structure 275 is followed by a series of slice structures 285. A slice is a series of an arbitrary number of adjacent macroblocks from a single row of macroblocks. Each slice structure 285 starts with a slice header including a slice start code (SSC) 287, a line number 288 indicating the line on which the slice starts and other components 289 of a slice structure as conventionally known.

Figure 3:
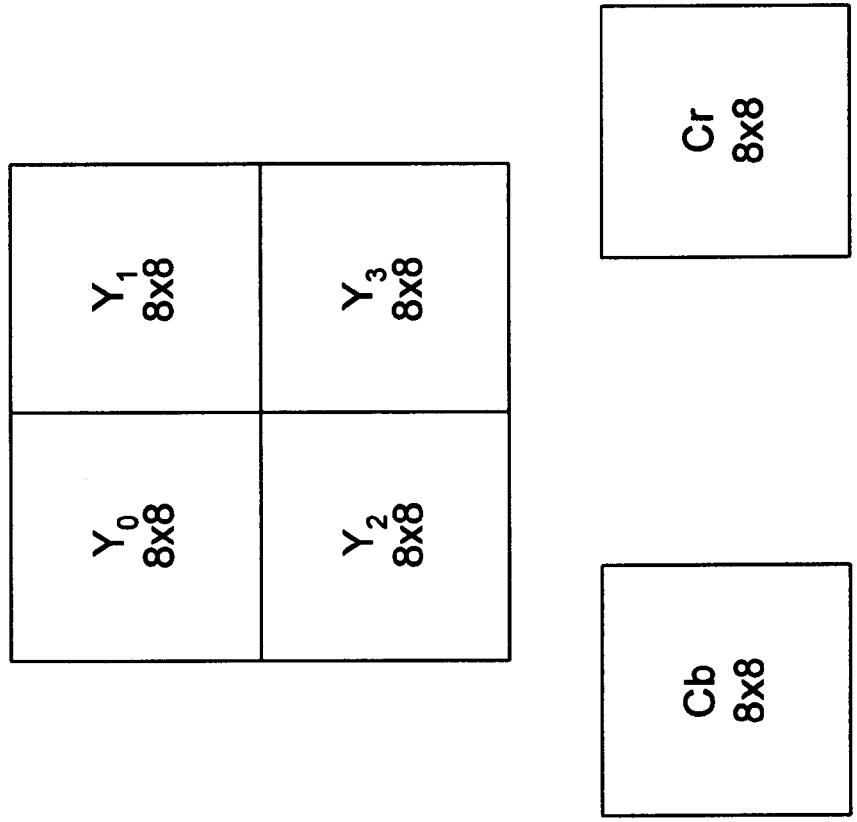
FIG. 3 is a block diagram of a 4:2:0 format used in an embodiment of the present invention.

The slice header of a slice structure 285 is followed by a series of macroblock structures 290. The term macroblock can either refer to source and decoded data or to the corresponding coded data elements. There are three chrominance formats for a macroblock, namely, 4:2:0, 4:2:2 and 4:4:4 formats, as described in the ISO/IEC International Standard 13818-2. Although it is recognized that the present invention is not limited by any chrominance formats, the 4:2:0 format, as is used by HDTV, is used here as an example to aid the description of the preferred embodiments of the present invention. A 4:2:0 macroblock includes six (6) 8×8 blocks, which are four (4) Y or 8×8 luminance blocks, one (1) Cb chrominance 8×8 block and one (1) Cr chrominance 8×8 block, as depicted in FIG. 3. In a macroblock, the 4 Y blocks together represent a section of the luminance component of a picture and the Cb and Cr blocks are spatially corresponding chrominance components of the picture.

A coded picture in a compressed video bit stream can be a field or a frame, and each macroblock within a coded picture can be an intra-coded or inter-coded. Intra-coded macroblocks do not need to be reconstructed with motion compensation. An inter-coded macroblock in a frame picture may be in one of three prediction modes: frame, field, or dual prime. A non-intra coded macroblock in a field picture may be in one of three prediction modes: field, 16×8, or dual prime. These prediction modes are described in more detail in the specification of the ISO/IEC International Standard 13818-2.

A macroblock structure 290 in the video bit stream 201 includes an MB header having information such as an address increment number 292 indicating the number of skipped macroblocks prior to this macroblock, a "macroblock type" 293 which is a variable length coded indicator that indicates the method of coding and content of the macroblock, a "frame_motion_type" 294a and a "field_motion_type" 294b indicating a type of the macroblock motion prediction, and a set of motion vector parameters 295 including a number of associated motion vectors and a motion vector format, a "motion_vertical_field_select [r][s]" which is a flag indicating which reference field picture shall be used to form the prediction when the macroblock is decoded, a "motion_code[r][s][t]" and a "motion_residual [r][s][t]" which are variable length codes used in motion vector decoding. The macroblock header also includes a coded block pattern (CBP) 296 which, if the macroblock is inter-coded, is a bitmap indicating which of the Y, Cr and Cb blocks corresponding to the macroblock are coded. The MB header is followed by corresponding coded blocks 297 corresponding to the $Y_0$, $Y_1$, $Y_2$, $Y_3$, Cb and/or Cr blocks as shown in FIG. 3. A description of the details of the structure and syntax of the video bit stream 201 can be found, for example, in the ISO/IEC International Standard 13818-2.

The information in the headers and extensions of the input video bit stream 201 are used as control information to control the decoding of video data in all of the modules of the decoding system 200 in FIG. 2A. The functions of the variable length decoding (VLD) module 210 is to decode the variable length coded data in the video bit stream 201. In one embodiment of the present invention, the VLD module 210 also performs the function of generating commands based on the control information contained in the headers and extensions of the input video bit stream 201. When the VLD module 210 receives a new picture structure from the bitstream, it sends a set registers command to set up the registers in the other modules of the decoding system 200. The VLD module also generates and packetizes macroblock (MB) command packets. An MB command packet associated with a macroblock to be decoded includes specific information such as the motion vectors, macroblock type, motion type, macroblock coordinates, and other flags. The VLD module 210 generates one MB command packet for each macroblock in the video bit stream 201, including the skipped macroblocks. The VLD module 210 passes 203 the MB command packets to the other modules of the decoding system 200 to control the decoding process performed by these other modules. The inverse scan (Scan$^{-1}$) module 220, the inverse quantization (q$^{-1}$) module 230, and the inverse discrete cosine transform (dct$^{-1}$) module 240, function to reverse the discrete cosine transform, quantization, and probably zigzag scan performed on the Y, Cb and Cr blocks of the original video, and are explained in detail in the ISO/IEC International Standard 13818-2. For each non-skipped macroblock, the output of the dct$^{-1}$ module 240 includes reverse discrete cosine transformed coefficient data in the form of data matrices (as represented by f[y][x] in FIG. 2) corresponding to some or all of the six (6) Y, Cb and Cr blocks of the macroblock. These coefficient data, together with the MB command packet associated with the macroblock, are transferred to the MC module 250.

The MC module 250, is typically operated on macroblock basis. For each inter-coded macroblock in the video bit stream 201, the MC module 250 forms prediction data from previously decoded pictures stored in the frame buffer 260 and combines those with coefficient data from the output of the dct$^{-1}$ module 240. An intra-coded macroblock does not need to be reconstructed with motion compensation. However, an intra-coded macroblock is also processed by the MC module 250, which writes the macroblock into specific addresses in the buffer memory 260. When all of the macroblocks of a picture are reconstructed, the picture is considered decoded. A decoded picture is written into the buffer memory 260 for temporary storage. If the decoded picture is an I-picture or a P-picture, it will stay in the buffer memory 260 as a reference picture until all of the pictures depending on the I-picture or P-picture for motion compensation are reconstructed.

Figure 4:
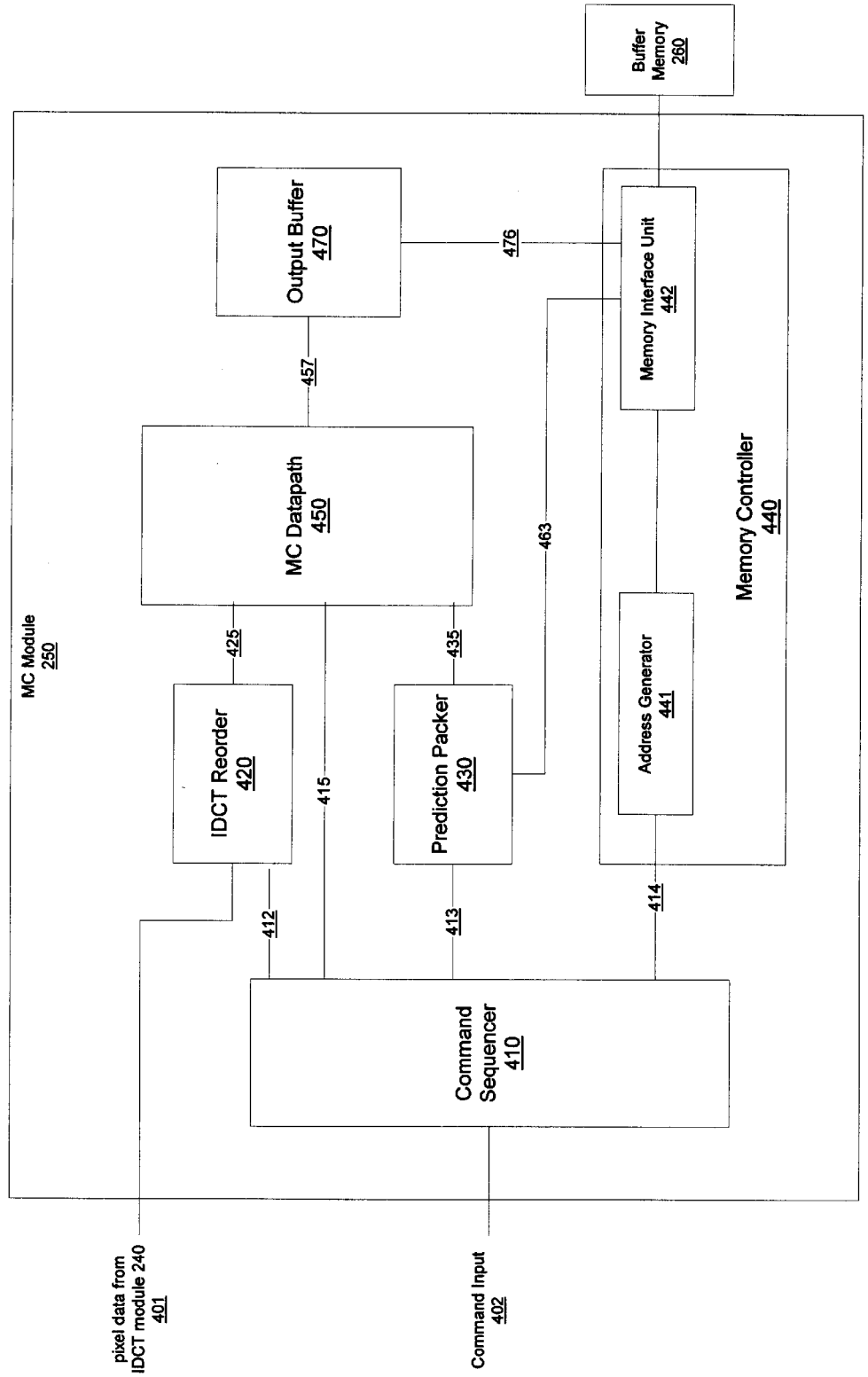
FIG. 4 is flowchart illustrating an overview of a motion compensation module in a video decoding system in accordance with an embodiment of the present invention.

FIG. 4 is a functional diagram of the MC module 250 in accordance with one embodiment of the present invention. As shown in FIG. 4, the MC module 250 comprises a command sequencer 410, an IDCT reorder unit 420, a prediction packer 430, an MC datapath 450, an output buffer 470, and a memory controller 440.

The command sequencer 410 include registers that can be initialized for each picture by the set registers command associated with the picture. It then receives the MB command packet 402 associated with each macroblock in the picture, generates the sub-level macroblock (MB) descriptors from the MB command packet, and distributes, 412, 413, 414 and 415, the MB descriptors to the IDCT reorder unit 420, the prediction packer 430, the memory controller 440 and the MC datapath 450, respectively.

For each inter-coded macroblock, the IDCT reorder unit receives the coefficient data 401 associated with the macroblock from the IDCT output and the relevant descriptors 412 from the command sequencer 410. It then prepares the coefficient data for motion compensation by reordering the coefficient data 401 based on the prediction mode of the macroblock as specified by the MB descriptors. The reordered coefficient data is sent 425 to the MC datapath 450.

The memory controller 440 includes an address generator 441 which generates memory addresses for reading prediction data from the buffer memory 260 and for writing decoded macroblocks into the buffer memory 260. In one embodiment of the present invention, the memory controller 440 also includes a memory interface unit 442 which provides an interface between the frame buffer and the relevant functional units in the MC module 250, such as the prediction packer 430 and the output buffer 470. This interface unit may alternatively be implemented as a separate unit from the memory controller and be placed either inside or outside of the MC module 250.

The prediction packer 430 fetches 463 prediction data from the frame buffer 260 based on memory addresses generated by the memory controller 440, and prepares the prediction data for later calculations by aligning the prediction data fetched from the frame buffer 260 with their pixel positions. It also packs the prediction data into prediction blocks according to the motion prediction mode as specified by the MB descriptors it receives 413. The prediction blocks are sent 435 to the MC datapath 450.

In general up to four separate prediction blocks are formed for each Y, Cb or Cr block. These prediction blocks are to be combined together to form a final prediction block. The coefficient data from the IDCT reorder unit and the final prediction block are to be combined to form the decoded Y or Cr/Cb block. The MC datapath 450 performs the required data calculations including half-pixel interpolation, combine predictions and adding predictions to coefficient data. These calculations are explained in detail in the ISO/IEC International Standard 13818-2.

The output buffer 470 temporarily stores intermediate and reconstructed data generated by the MC datapath. When the macroblock is reconstructed, the output buffer writes 476 the luminance and chrominance data samples corresponding to the macroblock into the buffer memory 260, based on the addresses generated by the memory controller 440.

In one embodiment of the present invention, the memory controller generates memory addresses based on related information sent 414 by the command sequencer 410 in the form of descriptors, and on a macroblock tiling format, which maps a decoded picture into memory spaces of the buffer memory 260. A decoded picture comes in two forms, frame and field. If field pictures are used in a compressed video bit stream, the field pictures typically occur in pairs (one top field and one bottom field) and together constitute a coded frame. The two fields of a frame may be encoded separately and appear in a compressed video bit stream as two separate coded field pictures. Both frame pictures and field pictures may be used in a single video sequence. Descriptions of frame and field pictures can be found in the ISO/IEC International Standard 13818-2. In one embodiment of the present invention, reconstructed field pictures of a same frame are combined and stored as one frame in the buffer memory 260, although these field pictures in the output 202 of the decoding process may be separated in time by a field period.

A frame is typically represented by three rectangular matrices of integers, a luminance (Y) matrix in which luminance data samples of the frame is arranged in raster scan order, and two chrominance (Cb and Cr) matrices in which Cb and Cr data samples of the frame, respectively, is arranged in raster scan order. If the frame is the union of two field pictures a top field and a bottom field, of a same frame, the top field is typically associated with every other line of samples including the topmost line of samples in the three rectangular matrices of integers representing the frame, and the bottom field is associated with the other lines of each of the three matrices.

In one embodiment of the present invention, the buffer memory 260 includes a number of frame spaces, each frame space for storing one decoded frame. A decoded frame is stored in a manner in which each Y, Cb or Cr data sample from a certain location in the Y, Cb or Cr matrix, respectively, is mapped to a corresponding memory location in a frame space in the buffer memory 260. The address of the corresponding memory location is determined by the macroblock tiling format. The macroblock tiling format divides the Y, Cb and Cr matrices and groups the luminance and chrominance data samples of a frame into a number of tiles, each tile including Y, Cb and/or Cr data samples corresponding to a given number of macroblocks and the data samples included in each tile can be stored in a single memory page of the buffer memory 260.

There are different ways of grouping the Y. Cb and Cr data samples of a frame into tiles. In one embodiments, each tile includes a combination of the Y, Cb and Cr data samples corresponding to a given number of macroblocks. In an alternative embodiment, in which the 4:2:0 format is used, the luminance data samples of a frame is grouped into luminance tiles, and the chrominance data samples of the frame is grouped into chrominance tiles. Each luminance tile includes only Y data samples corresponding to a given number of macroblocks, and each chrominance tile includes only Cb and Cr data samples corresponding to a given number of macroblocks. The luminance tiles and the chrominance tiles of a decoded frame are stored in two separate memory spaces, a luma space and a chroma space, respectively, in a frame space in the buffer memory 260. Each luminance tile is stored in a separate memory page in the luma space, and each chrominance tile is stored in a separate memory page in the chroma space. A luma base address (which is the address of the first byte location of the luma space) and a chroma base address (which is the address of the first byte location of the chroma space) are associated with the luma space and chroma space, respectively. In one embodiment of the present invention, the VLD module includes registers which holds the luma base address and chroma base address of each frame space in the buffer memory 260. When a new picture is starting to be decoded, the VLD module allocates a frame space for storing the picture when it is decoded by sending the luma base address and chroma base address of the frame space to the MC module 250 through the set registers command.

Figure 5A:
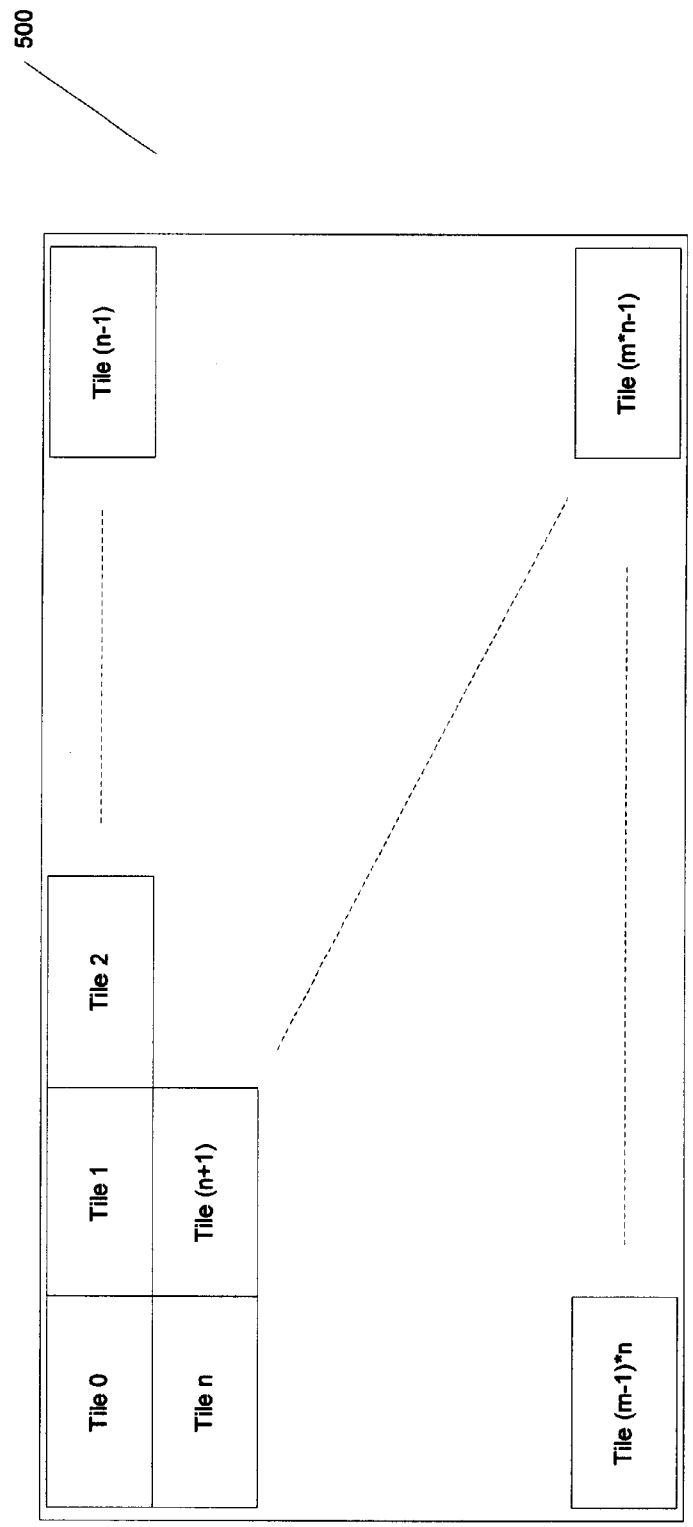
FIG. 5A is a block diagram illustrating an example of dividing a luminance matrix of a decoded frame into a plurality of non-overlapping rectangular tiles.

Referring now to FIG. 5A which illustrates an example of dividing the Y matrix of a decoded frame into luminance tiles, the Y matrix 500 of the decoded frame is divided into a number (m*n) of non-overlapping rectangular luminance tiles, Tile 0, Tile 1, Tile 2, . . . , and Tile (m*n-1), where m is the number of rows of tiles and n is the number of tiles in each row of tiles. The parameter n is also called luma stride in tiles. Each luminance tile includes luminance data samples corresponding to a given number of macroblocks for storing in a single memory page in the luma space. Tile 0, Tile 1, Tile 2, . . . , and Tile (m*n-1) are mapped to consecutive memory pages in the luma space, with Tile 0 in the memory page containing the luma base address.

Figure 5B:
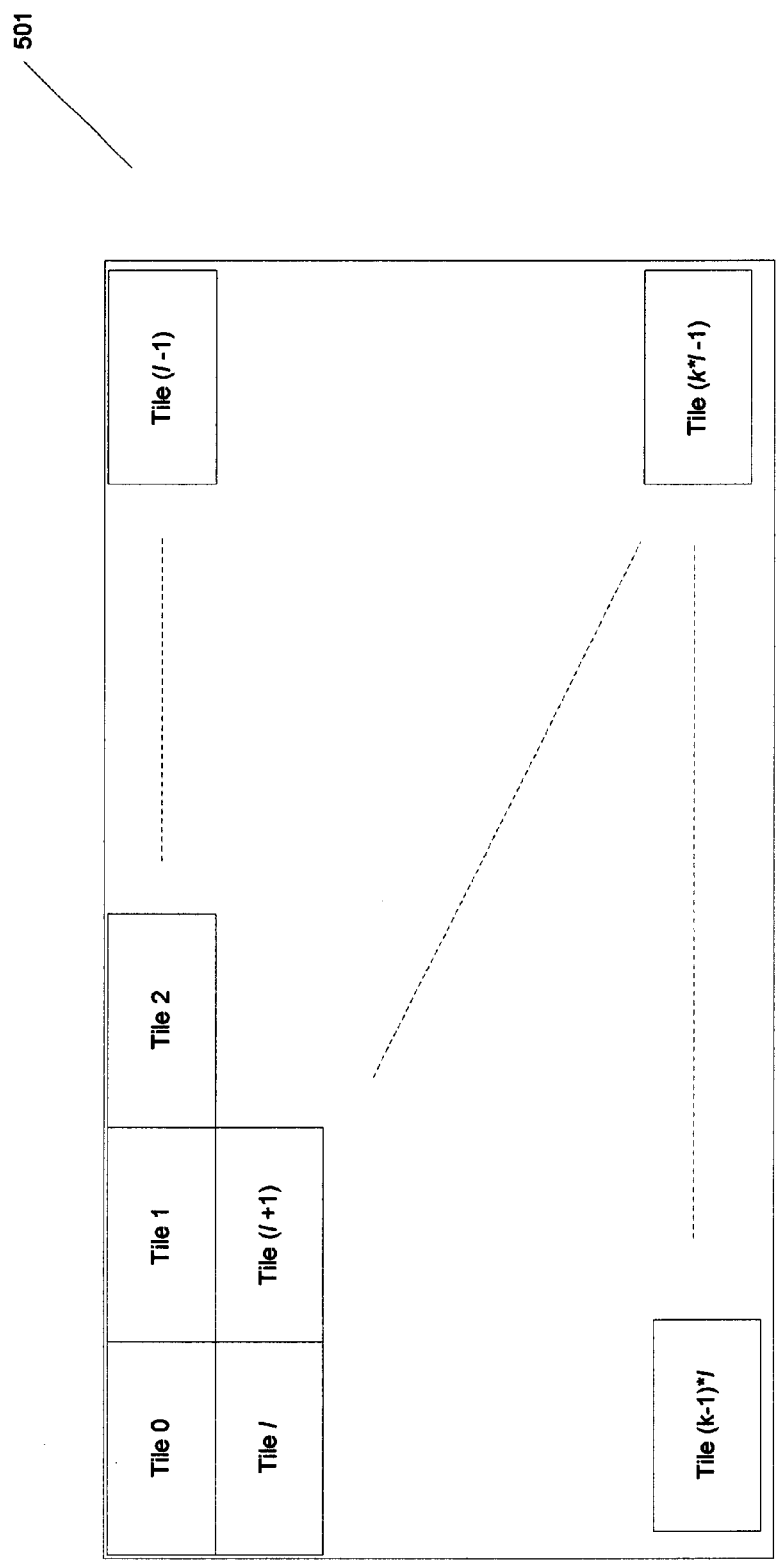
FIG. 5B is a block diagram illustrating an example of dividing an interleaved Cb/Cr matrix of a decoded frame into a plurality of non-overlapping rectangular tiles.

Referring now to FIG. 5B which illustrates an example of dividing the Cb and Cr matrices of a decoded frame into chrominance tiles, the columns of the two chrominance (Cb and Cr) matrices of the decoded frame are interleaved to form an interleaved Cb/Cr matrix 501, such that every other column of the interleaved Cb/Cr matrix is a column of the Cb matrix. The interleaved Cb/Cr matrix 501 is then divided into a number (k*l) of non-overlapping rectangular tiles, Tile 0, Tile 1, Tile 2, . . . , Tile (k*l-1), where k is the number of rows of tiles and 1 is the number of tiles in each row of tiles. The parameter l is also called chroma stride in tiles. Each chrominance tile includes chrominance data samples corresponding to a given number of macroblocks, for storing in a single memory page in the chroma space. Tile 0, Tile 1, Tile 2, . . . , Tile (k*l-1) in FIG. 5B are mapped to consecutive memory pages in the chroma space, with Tile 0 in the memory page having the chroma base address.

Typically each luminance or chrominance data sample occupies a 1-byte address space of the buffer memory 260. In one embodiment of the present invention, the buffer memory 260 includes a dynamic random access memory (DRAM) having 2 kilobyte pages. Each page of the buffer memory 260 is organized in 128-bit (16-byte) octawords, and there are 128 octawords within each page of the buffer memory 260. Data is also written to and read from the buffer memory 260 in octaword units. For such a memory system, if the resolution of the frame is 720 pixels by 480 scan lines, each luminance tile in FIG. 5A, except the luminance tiles in the right-most column, is preferably a 64×32 submatrix made of luminance data samples corresponding to 8 macroblocks. Each of the luminance tiles in the right most column, or the nth column, is a 16×32 submatrix made of luminance data samples corresponding to 2 macroblocks. Therefore, m=15 and n=12 for this particular example. As for the chrominance data, each chrominance tile in FIG. 5B, except for the chrominance tiles in the right-most column and the bottom row, is preferable a 64×32 submatrix made of chrominance data samples corresponding to 16 macroblocks. Therefore, k=8 and l=12 for this particular example. Each chrominance tile in the rightmost column, or the 12th column, is a 16×32 submatrix made of chrominance data samples corresponding to 4 macroblocks. Each chrominance tile in the bottom row, or the 8th row, is a 64×16 submatrix made of chrominance data samples corresponding to 8 macroblocks.

Figure 5C:
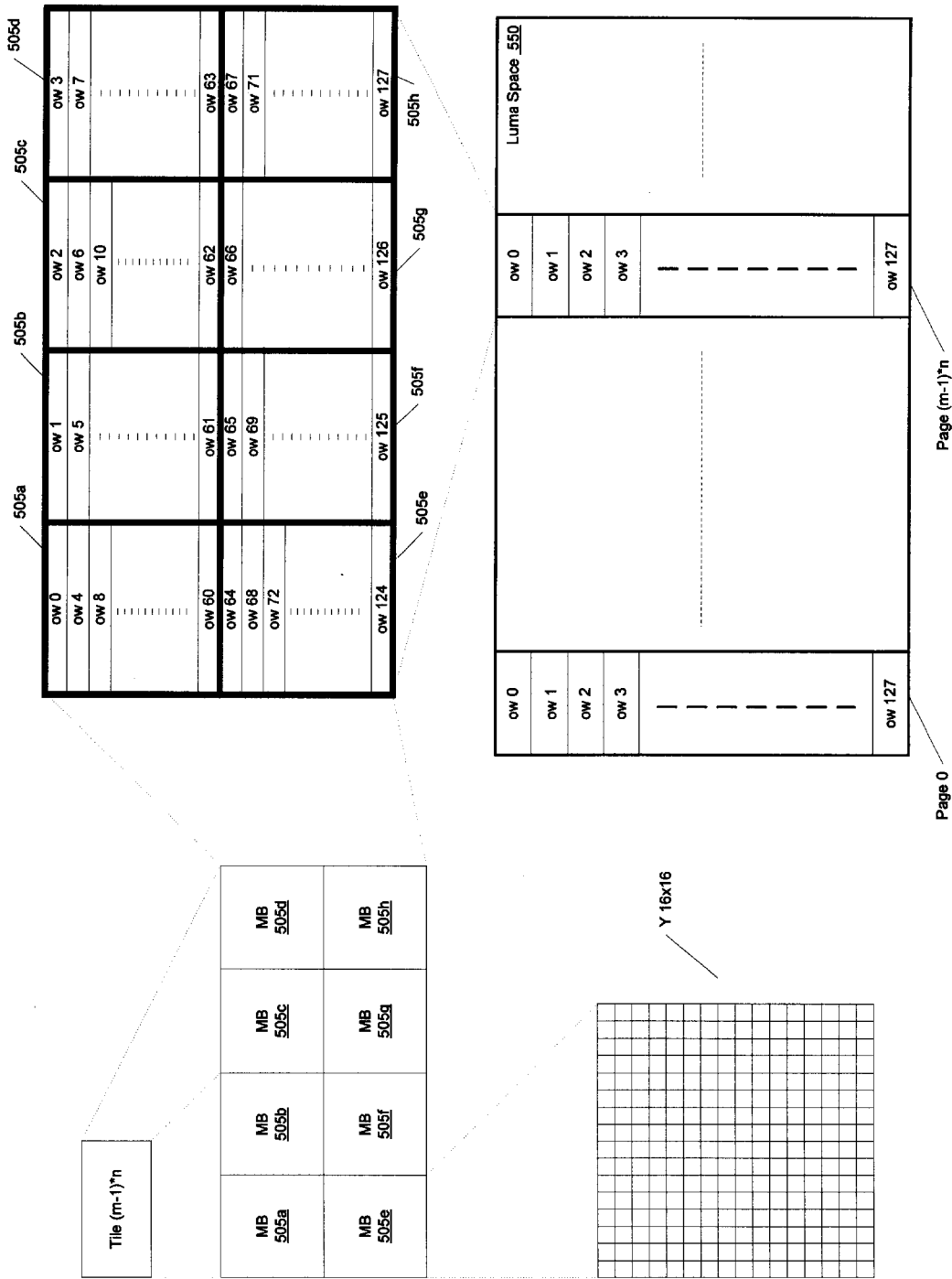
FIG. 5C is a block diagram illustrating an example of mapping luminance data samples in a single tile to the actual octaword positions in a single memory page corresponding to the tile.

Each horizontal line of 16 luminance data samples corresponding one luminance macroblock, or a "Y macroblock line", is preferable mapped to one 16-byte octaword in the buffer memory 260. The actual mapping of the Y macroblock lines in a single luminance tile to the octaword positions in a single memory page corresponding to the tile is flexible and can be optimized for each specific application. FIG. 5C illustrates example of mapping each Y macroblock line in a luminance tile, to a specific octaword position in a single page in a luma space 550 in the buffer memory 260, in accordance with one embodiment of the present invention. In the example shown in FIG. 5C, the Y macroblock lines in Tile (m-1)*n in FIG. 5A, which include Y data samples corresponding to 8 adjacent macroblocks 505a–h, is mappled in raster scan order to the octawords in page (m-1)*n in the luma space 550. Within each octaword, data samples are preferably arranged in little endian, also following the raster-scan order.

Each horizontal line of interleaved Cb/Cr data samples corresponding to one macroblock, or a Cb/Cr macroblock line, is preferably mapped to one 128-bit octaword in the buffer memory 260. The actual mapping of the Cb/Cr macroblock lines in a single chrominance tile to the octaword positions in a single page of memory corresponding to the chrominance tile is flexible and can be optimized for each specific application. FIG. 5E illustrates example of mapping each Cb/Cr macroblock line in a chrominance tile, to a specific octaword position in a single page in a chroma space 551 in the buffer memory 260, in accordance with one embodiment of the present invention. In the example shown in FIG. 5E, the Cb/Cr macroblock lines in Tile n in FIG. 5B, which include Cb/Cr data samples corresponding to 16 adjacent macroblocks 506a–p, is mapped in raster scan order to the octawords in page n in the chroma space 550. Within each octaword, data samples are preferably arranged in little endian, also following the raster-scan order.

The memory address at which each luminance data sample will be stored in the buffer memory 260 can be computed from a pair of X and Y coordinates of the luminance data sample. The X coordinate of the a luminance data sample is one less than the column number of the luminance data sample in the luminance matrix, and the Y coordinate of the luminance data sample is one less than the row number of the luminance data sample in the luminance matrix. The column number and the row number of a luminance data sample in the luminance matrix can be derived from the macroblock descriptors associated with the macroblock in which the luminance data sample lies. In one embodiment of the present invention, the address at which each luminance data sample will be stored is represented by a 23-bit linear offset address (from the luma base address). For a 720×480 Y matrix, the X and Y can be expressed by two 11-bit binary numbers, respectively. The 23-bit offset address representing the byte location for storing the luminance data sample can be calculated from the 11-bit X and Y coordinates of the luminance data sample using a Luma offset address formula as shown in Table 1.

TABLE 1

Luma Offset Address Formula

| Bit 22 | 11 | 10 | 6 | 5 | 4 | 3 | 0 |
|---|---|---|---|---|---|---|---|
| Y[10:5]*n + X[10:6] | | Y[4:0] | | X[5:4] | | X[3:0] | |

Bits 11 to 22 of the 23-bit offset address alone may be used to represent the memory page offset from base memory page in the luma space. Bits 4 to 10 of the 23-bit offset address alone may be used to represent the octaword offset from the first octaword within the memory page. Bits 0 to 3 of the 23-bit offset address alone may be used to represent the byte offset from the first byte within the octaword. Bit 0 to 3 are not used for writing data to or reading data from the buffer memory 260 because all data within an octaword is transferred to and from the buffer memory together.

For example, a luminance data sample in the 250$^{th}$ column and the 164$^{th}$ row of the Y matrix 500 would have the following 11-bit X and Y coordinates:
X=00011111001, and Y=00010100011.
Therefore,
X[3:0]=1001,
X[5:4]=11,
Y[4:0]=00011,
Y[10:5]=000101,
X[10:6]=00011

$$Y[10:5]*n+X[10:6]=000101*1100+00011=111111,$$

and the 23 bit offset address of the luminance data sample in the luma space for storing the Y matrix 500 would be:
00000011111100011111001

Figure 5D:
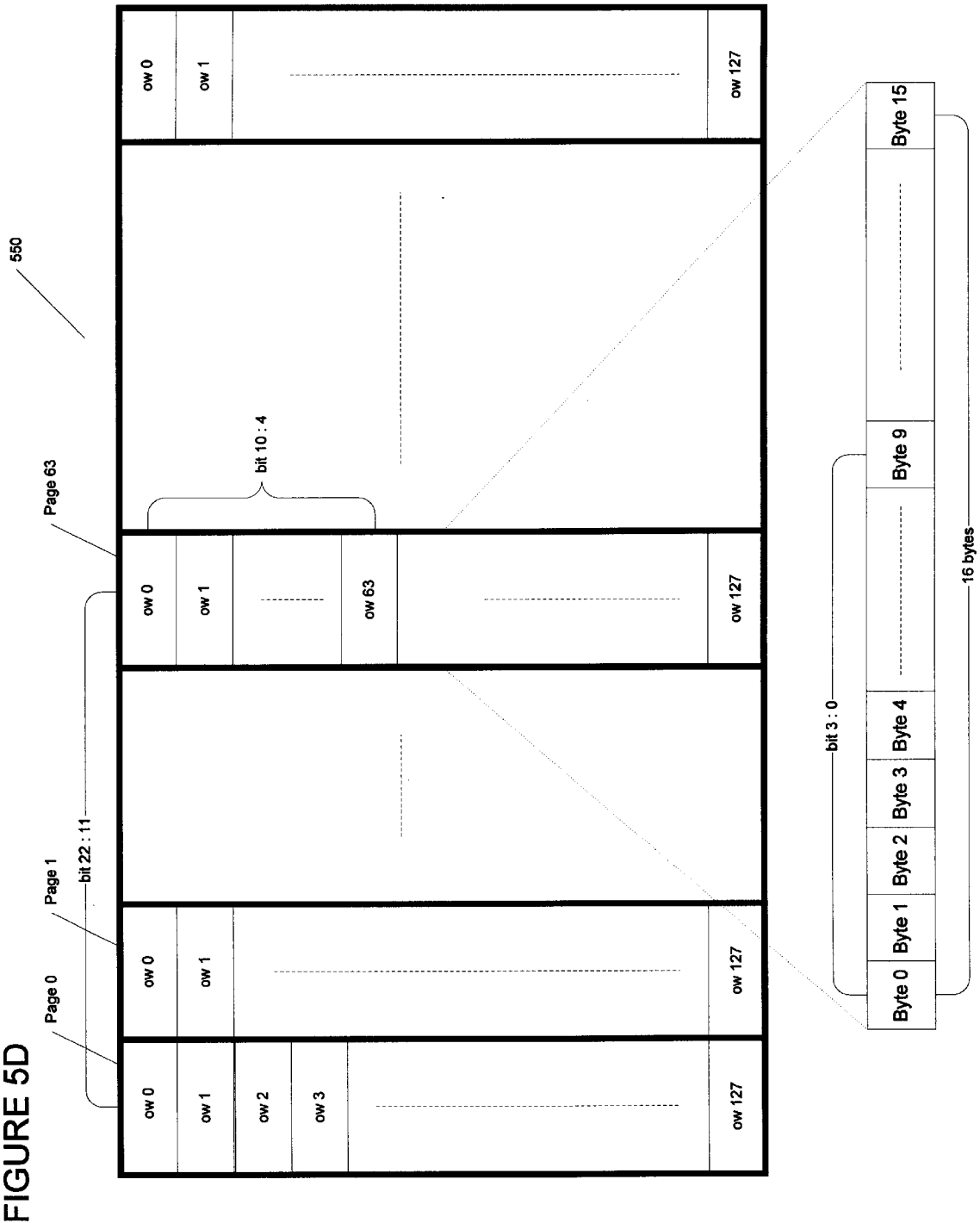
FIG. 5D is a block diagram illustrating a location of a luminance data sample in a frame buffer memory as indicated by a 23-bit offset address, which can be calculated by the X and Y coordinates of the luminance data sample.
Figure 5E:
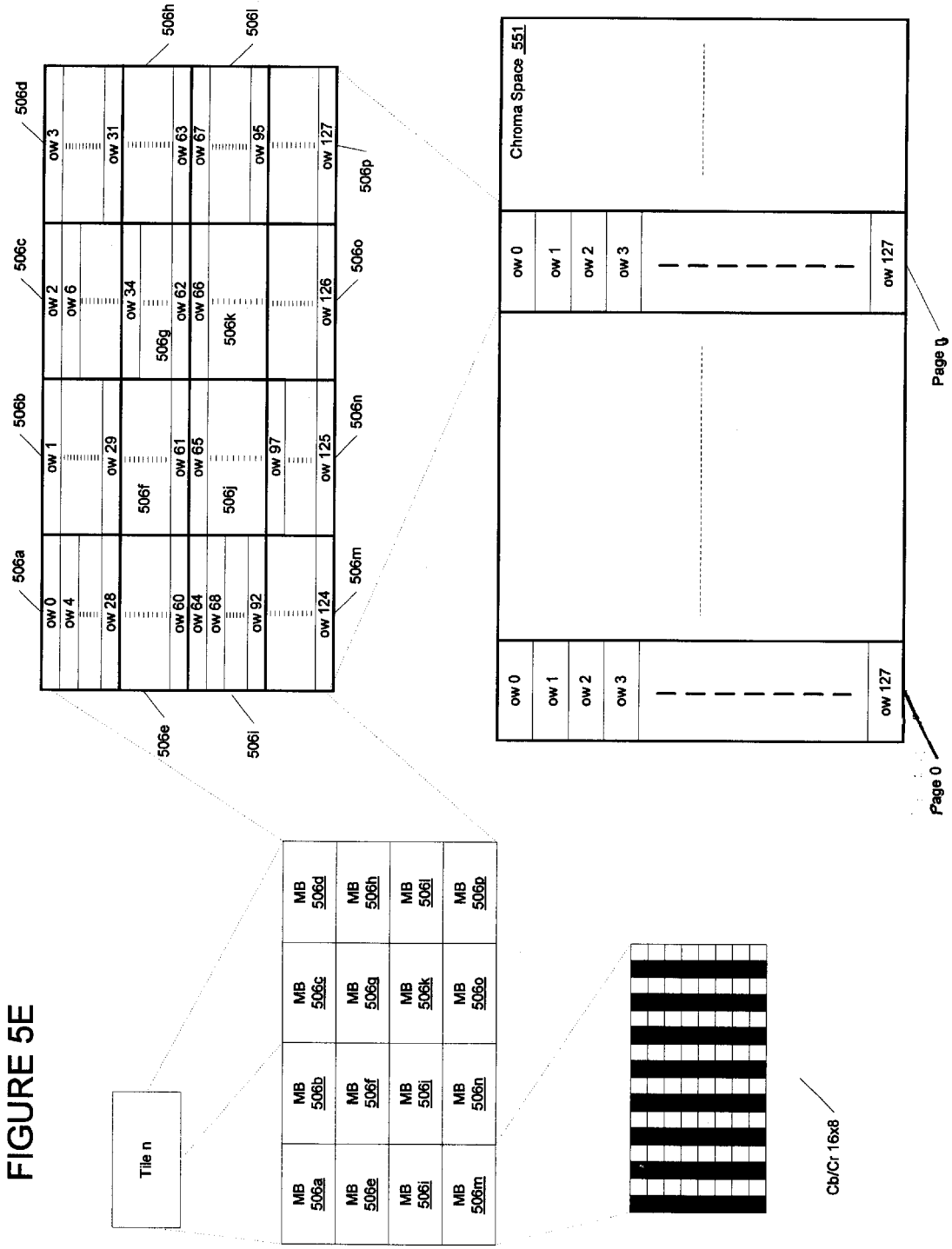
FIG. 5E is a block diagram illustrating an example of mapping interleaved Cb/Cr data samples in a single tile to the actual octaword positions in a single memory page corresponding to the tile.

As shown in FIG. 5D, which illustrates the luma space 550, Bits 11 to 22 of the above 23-bit offset address, which are 000000111111 or decimal 63, represents the specific memory page in which the luminance data sample is or will be stored. In this case it is the 63$^{rd}$ memory page after the base memory page in the luma space 550. Bits 4 to 10 of the 23-bit offset address, which are 0001111 or decimal 15 represents the specific octaword in which the luminance data sample is or will be stored. In this case, it is the octaword 15 within memory page 63. Bits 0 to 3 of the 23-bit offset address, which are 1001 or decimal 9, represents the specific byte for storing the luminance data sample. In this case, it is byte 9 within the octaword 15 within memory page 63 within the luma space 550.

The memory address at which each chrominance data sample will be stored in the buffer memory 260 can be computed from a pair of X^ and Y^ coordinates of the chrominance data sample. The X^ coordinate of the a chrominance data sample is one less than the column number of the chrominance data sample in the interleaved chrominance matrix, and the Y^ coordinate of the chrominance data sample is one less than the row number of the chrominance data sample in the interleaved chrominance matrix. Once the exact order in which the Cb and Cr matrices are interleaved is decided, the column number and the row number of a chrominance data sample in the interleaved chrominance matrix can be derived from the macroblock descriptors associated with the macroblock in which the chrominance data sample lies. In one embodiment of the present invention, the address at which each chrominance data sample will be stored is represented by a 22-bit linear offset address (from the chroma base address). For a 720×240 interleaved Cb/Cr matrix, X^ can be expressed by an 11-bit binary number, and Y^ can be expressed by a 10-bit binary number. The 22-bit offset address representing the byte location for storing a chrominance data sample can be calculated from the X^ and Y^ coordinates of the chrominance data sample using a chroma offset address formula as shown in Table 2.

TABLE 2

Chroma Offset Address Formula

| Bit 21 | 11 | 10 | 6 | 5 | 4 | 3 | 0 |
|---|---|---|---|---|---|---|---|
| Y^[9:5]*n + X^[10:6] | | Y^[4:0] | | X^[5:4] | | X^[3:0] | |

Bits 11 to 21 of the 22-bit offset address alone may be used to represent the memory page offset from base memory page in the chroma space. Bits 4 to 10 of the 22-bit offset address alone may be used to represent the octaword offset from the first octaword within the memory page. Bits 0 to 3 of the 22-bit offset address alone may be used to represent byte offset from first byte within the octaword. Again, Bits 0 to 3 are not used for writing data to or reading data from the buffer memory because all data within an octaword is transferred to and from the buffer memory together.

As an example, if the interleaved Cb/Cr matrix is interleaved in a way that the first column of the interleaved Cb/Cr matrix is a Cb column, a Cr data sample in the 125$^{th}$ column and the 164$^{th}$ row of the Cr matrix would be in the 250$^{th}$ column and the 164$^{th}$ row of the interleaved Cb/Cr matrix and would have the following 11-bit X coordinate and 10-bit Y coordinate:
X^=00011111001, and Y^=0010100011.
Therefore,
X^[3:0]=1001,
X^[5:4]=11,
Y^[4:0]=00011,
Y^[9:5]=00101,
X^[10:6]=00011

$$Y^[10:5]*n+X^[10:6]=00101*1100+00011=11111,$$

and the 22 bit offset address of the chrominance data in a buffer memory 26
0000011111110001111100

Figure 5F:
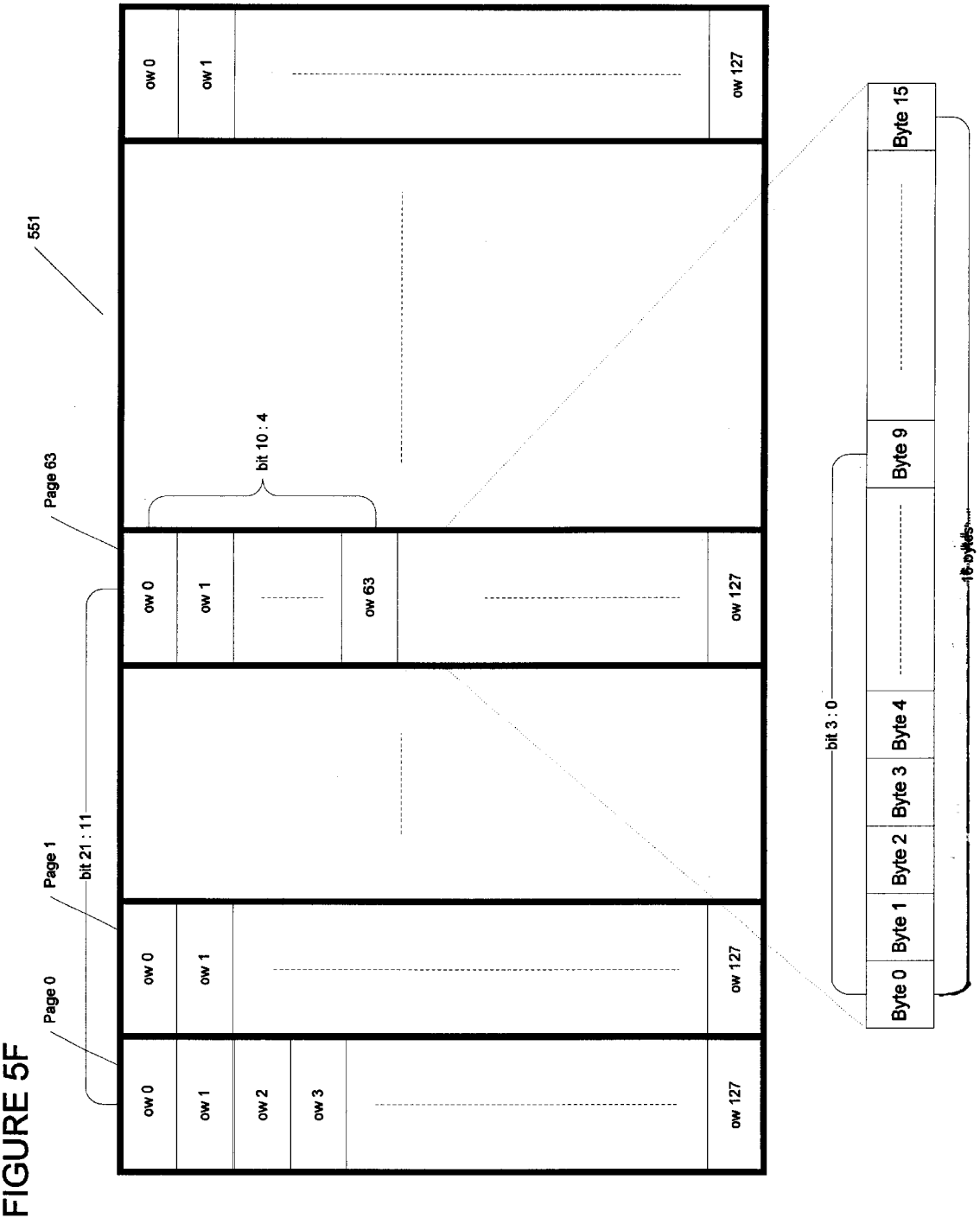
FIG. 5F is a block diagram illustrating a location of a chrominance data sample in a frame buffer memory as indicated by a 22-bit offset address which can be calculated by the $X^{\wedge}$ and $Y^{\wedge}$ coordinates of the chrominance data sample.

As shown in FIG. 5F, which illustrates the chroma space 551, Bits 11 to 21 of the above 22-bit offset address, which are 00000111111 or decimal 63, represents the specific memory page in which the chrominance data sample is or will be stored. In this case it is the 63$^{rd}$ memory page after the base memory page in the chroma space 551. Bits 4 to 10 of the 22-bit offset address, which are 0001111 or decimal 15 represents the specific octaword in which the chrominance data sample is or will be stored. In this case, it is the octaword 15 within memory page 63. Bits 0 to 3 of the 22-bit offset address, which are 1001 or decimal 9, represents the specific byte for storing the chrominance data sample. In this case, it is byte 9 within the octaword 15 within memory page 63 within the chroma space 550.

Referring now to FIG. 4, using Table 1 and Table 2, the address generator 441 in the memory controller 440 in the MC module 250, can determine the memory addresses for storing a decoded macroblock in the buffer memory 260 and generate these memory addresses for the output buffer 470 to write data in the decoded Y, Cr/Cb blocks of a decoded macroblock to the buffer memory 260. There would be no page break in writing the luminance or the chrominance components of a macroblock into the buffer memory 260, because the luminance or chrominance data samples corresponding to each macroblock (whether it is from a field picture of a frame picture) are mapped to memory locations in a single page in the buffer memory 260.

The address generator 441 can also use Table 1 and Table 2 to determine the memory addresses for fetching prediction blocks required for the reconstruction of a macroblock from the buffer memory 260, and generate these memory addresses for the prediction packer to fetch data associated with the prediction blocks from the buffer memory 260. In addition to Table 1 and Table 2, the address generator 441 also use the motion vector data, the picture type, the macroblock type and the prediction mode of the macroblock supplied 414 by the command sequencer 410 in the form of descriptors. Depending on the picture type, the macroblock type and the prediction mode associated with a macroblock under reconstruction, the required reference pixels may be different for the same motion vector(s). However, it can be shown that for all of the possible combinations of picture, macroblock and prediction types, significant reduction in page breaks is achieved by using the macroblock tiling format as compared to the traditional scan line based address mapping methods for storing the reference pictures.

Figure 6A:
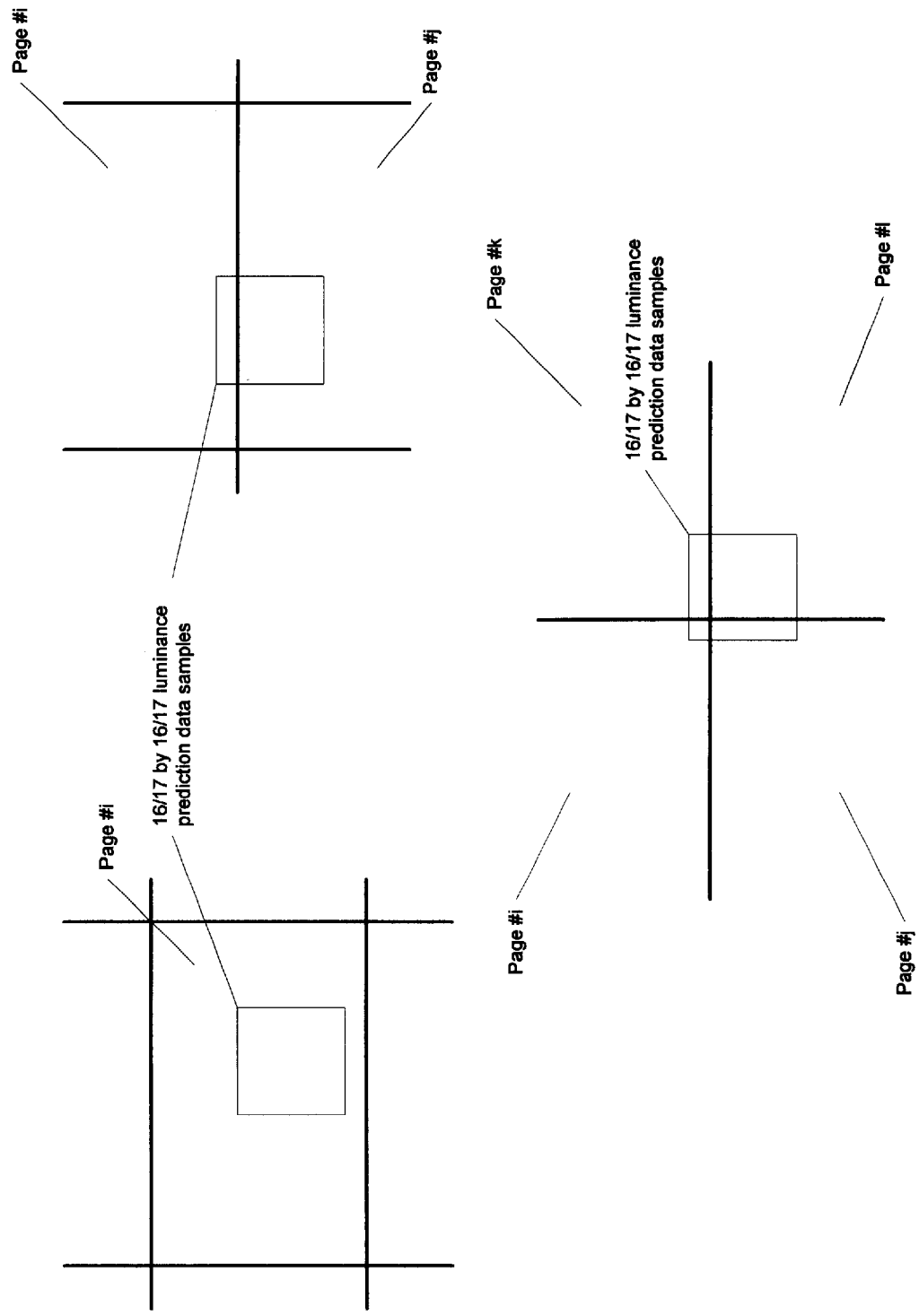
FIG. 6A is a block diagram showing a 16/17 by 16/17 block of luminance prediction data samples falling across 1, 2, or 4 memory pages.
Figure 6B:
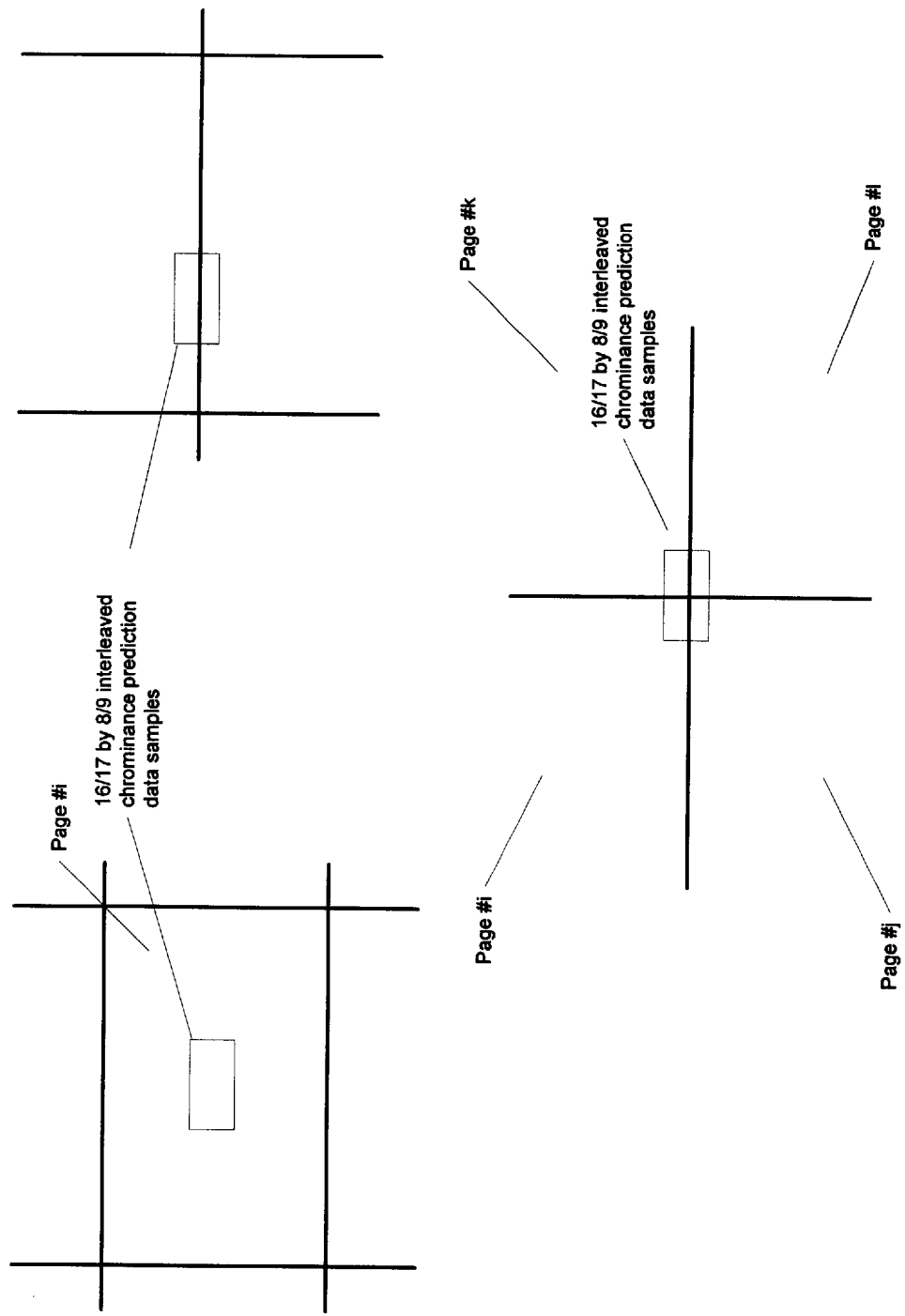
FIG. 6B is a block diagram showing a 16/17 by 8/9 block of interleaved Cb/Cr prediction data samples falling across 1, 2, or 4 memory pages.

For example, during the reconstruction of a inter-coded macroblock in a P-coded frame picture using frame prediction type, a block of 16×16 Y prediction data samples and a block of 16×8 interleaved Cb/Cr prediction data samples are required to be fetched from a past I-picture or P-picture frame in the buffer memory 260. The addresses of the upper left corner of the prediction blocks are determined by the address generator 441 based on the motion vector associated with the Inter-coded macroblock. When the motion vector points in the space in between pixel positions, half-pixel averaging may be used, meaning that one extra row and/or one extra column of each of the Y, Cb and Cr samples must be fetched. (Description of half-pixel averaging can be found, for example, in the specification of the ISO/IEC International Standard 13818-2.) The 16 (or 17) by 16 (or 17) Y prediction data samples may fall across 1, 2 or 4 memory pages, as shown in FIG. 6A, in which memory page boundaries are illustrated by solid lines. The 16 (or 18) by 8 (or 9) interleaved Cb/Cr prediction data samples may also fall across 1, 2, or 4 pages, as illustrated in FIG. 6B. Therefore, in the worst case, there would only be three page breaks encountered when transferring the octawords containing these Y data samples or the interleaved Cb/Cr data samples from the buffer memory 260.

Figure 6D:
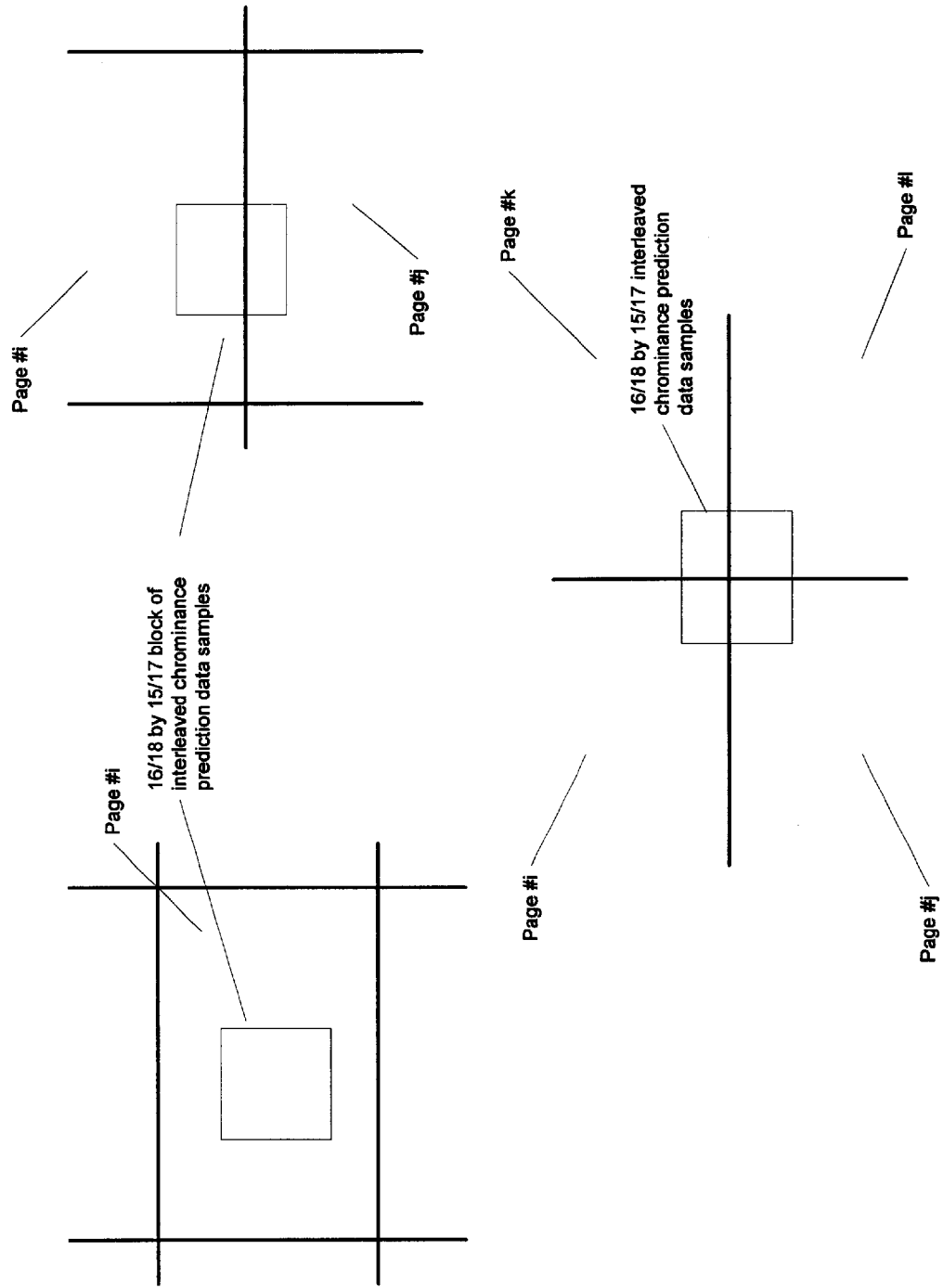
FIG. 6D is a block diagram showing a 16/18 by 15/17 interleaved Cr/Cr prediction data samples falling across 1, 2, or 4 memory pages.

As another example, during the reconstruction of a Inter-coded macroblock in a P-coded field picture using field prediction mode, every other line of a block of 16×31 Y prediction data samples and every other line of a block of 16×15 interleaved Cb/Cr prediction data samples are required to be fetched from a past I-picture or P-picture frame in the buffer memory 260. The addresses of the upper left corner of the prediction blocks are determined by the address generator 441 based on the motion vector associated with the Inter-coded macroblock. When the motion vector points in the space in between pixel positions, half-pixel averaging may be used, meaning that one extra row and/or one extra column of samples from the same field in the stored frame must be fetched. The 16 (or 17) by 31 (or 33) Y block can fall across 1, 2 or 4 memory pages, as shown in FIG. 6C. The 16 (or 18) by 15 (or 17) interleaved Cb/Cr block can also fall across 1, 2 or 4 pages, as illustrated in FIG. 6D. Therefore, in the worst case, there would only be three page breaks encountered when transferring the octawords containing every other line of the Y data block or every other line of the interleaved Cb/Cr data block from the buffer memory 260.

Figure 1A:
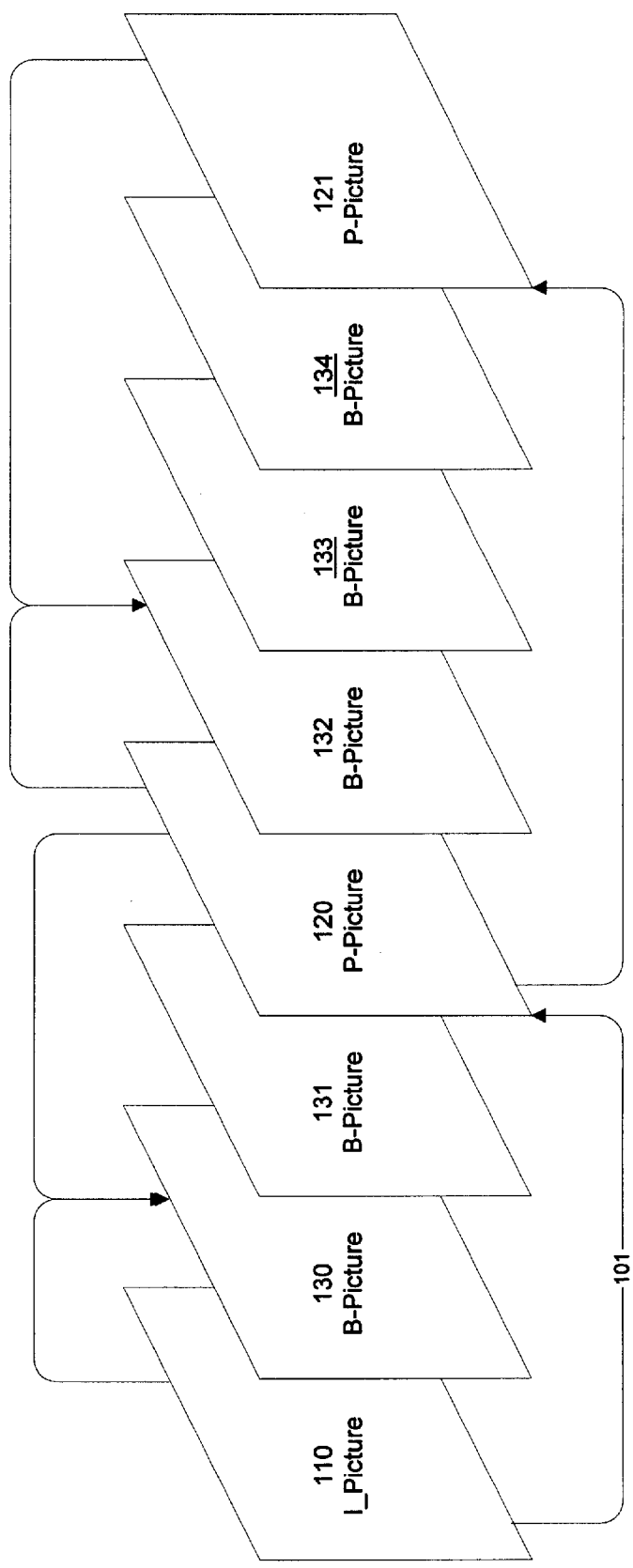
FIG. 1A is a diagram of an example of a group of intra-coded, predictive coded and bidirectional predictive coded picture frames and their relationship among each other as conventionally known.
Figure 1B:
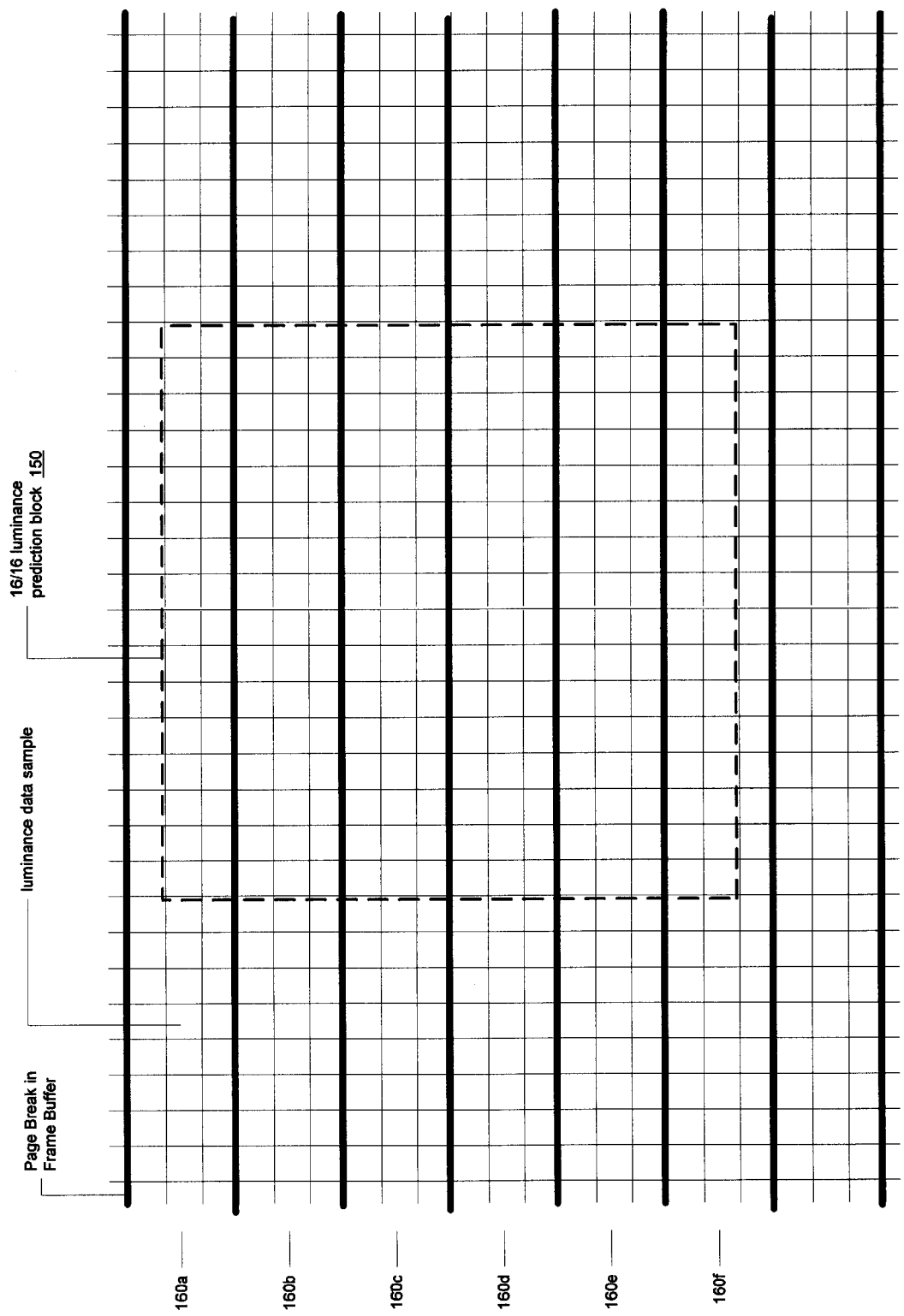
FIG. 1B is a diagram illustrating that when prior art scan line based address mapping were used, at least 10 page breaks will be encountered in performing the read and write operations associated with the reconstruction of the luminance component of a 16 by 16 macroblock.

Therefore, compared to conventional scan line based address mapping, as illustrated in FIG. 1B, in which is shown that a 16 by 16 block of luminance data samples typically fall across 5 memory pages for both read and write operations, significant reduction on the number of page breaks, as can be encountered during the reconstruction of a macroblock using motion compensation, is achieved by practicing the present invention.

In an alternative embodiment of the present invention, the buffer memory 260 includes a dynamic random access memory (DRAM) having 1 kilobyte pages. Each page of the buffer memory 260 is organized in 64-bit (8-byte) words. For such a memory system, if the resolution of the frame is 720 pixels by 480 scan lines, each luminance tile in FIG. 5A, except the luminance tiles in the right-most column, is preferably a 64×16 submatrix made of luminance data samples corresponding to 4 16×16 macroblocks. Each of the luminance tiles in the right most column, or the nth column, is a 16×16 submatrix made of luminance data samples corresponding to 1 macroblock. Therefore, m=30 and n=12 for this particular example. As for the chrominance data, each chrominance tile in FIG. 5B, except for the tiles in the right-most column, or the lth column is preferably a 128×8 submatrix made of chrominance data samples corresponding to 8 macroblocks. Therefore, k=30 and l=6 for this particular example. Each chromiance tile in the rightmost column, or the lth column, is a 80×8 submatrix made of chrominance data samples corresponding to 5 macroblocks. In this embodiment, Table 3 and Table 4 may be used in place of Table 1 and Table 2, respectively by the address generator 441 in the memory controller 440 to determine the addresses for fetching prediction data from the buffer memory 260 and for writing a decoded macroblock into the buffer memory 260.

TABLE 3

Luma Offset Address Formula

| Bit 22 | | 10 | 9 | | 6 | 5 | | 3 | 2 | | 0 |
|---|---|---|---|---|---|---|---|---|---|---|---|
| Y[10:4]*n + X[10:6] | | | Y[3:0] | | | X[5:3] | | | X[2:0] | | |

TABLE 4

Chroma Offset Address Formula

| Bit 21 | | 11 9 | | 7 6 | | 3 2 | | 0 |
|---|---|---|---|---|---|---|---|---|
| Y[9:3]*n + X[10:7] | | Y[2:0] | | X[6:3] | | X[2:0] | | |

The macroblock tiling format as described above may also be utilized to improve an MPEG encoding process and an MPEG encoding system.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

We claim:

1. A method of mapping luminance (Y) and chrominance (Cb and Cr) data samples of a picture frame into a memory, the picture frame partitioned into a plurality of macroblocks, each macroblock being a predetermined portion of the Y, Cb and Cr data samples of the picture frame, the memory including a plurality of memory pages of a certain size, the method comprising:

grouping the Y, Cb and Cr data samples of the picture frame into a plurality of tiles, each tile having a combination of Y, Cb and Cr data samples corresponding to a given number of macroblocks for storing in a single memory page in the memory; and mapping the combination of Y, Cb and Cr data samples in each tile into a single memory page in the memory.

2. A method of mapping luminance (Y) and chrominance (Cb and Cr) data samples of a picture frame into a memory, the picture frame partitioned into a plurality of macroblocks, each macroblock being a predetermined portion of the Y, Cb and Cr data samples of the picture frame, the memory including a plurality of memory pages of a certain size, the method comprising:

grouping the Y data samples of the picture frame into a plurality of luminance tiles, each luminance tile having luminance data samples corresponding to a given number of macroblocks for storing in a single memory page in the memory;

grouping the Cb and Cr data samples of the picture frame into a plurality of chrominance tiles, each chrominance tile having Cb and Cr data samples corresponding to a given number of macroblocks for storing in a single memory page in the memory;

mapping the luminance data samples in each of the luminance tiles into a single memory page in the memory; and mapping the chrominance data samples in each of the chrominance tiles into a single memory page in the memory.

3. The method of claim 2 wherein the step of grouping the Y data samples comprises forming a Y matrix in which the Y data samples are arranged in raster scan order; and dividing the Y matrix into m*n tiles, where m is a number of rows of tiles and n is a number of tiles in each row of tiles.

4. The method of claim 2 wherein the step of grouping the Cb and Cr data samples comprises forming a Cb matrix in which the Cb data samples are arranged in raster scan order;

forming a Cr matrix in which the Cr data samples are arranged in raster scan order;

forming an interleaved Cb/Cr matrix by interleaving the columns of the Cb matrix and the Cr matrix; and dividing the interleaved Cb/Cr matrix into k*l tiles, where k is is a number of rows of tiles and l is a number of tiles in each row of tiles.

5. The method of claim 3 wherein the picture frame is a CCIR 601 frame having 720 pixels by 480 scan lines partitioned into 1350 macroblocks, each macroblock corresponds to a 16 by 16 block of Y data samples, an 8 by 8 block of Cb data samples and an 8 by 8 block of Cr data samples, the memory includes a plurality of 2 kilobyte memory pages, and the dividing step comprises dividing the 720 by 480 Y matrix into 12 columns by 15 rows of non-overlapping rectangular tiles, the majority of the rectangular tiles having Y data samples corresponding to 8 adjacent macroblocks.

6. The method of claim 4 wherein the picture frame is a CCIR 601 frame having 720 pixels by 480 scan lines partitioned into 1350 macroblocks, each macroblock corresponds to a 16 by 16 block of Y data samples, an 8 by 8 block of Cb data samples and an 8 by 8 block of Cr data samples, the memory includes a plurality of 2 kilobyte memory pages, and the dividing step comprises dividing the 720 by 240 interleaved Cb/Cr matrix into 12 columns by 8 rows of non-overlapping rectangular tiles, the majority of the rectangular tiles having Cb and Cr data samples corresponding to 16 adjacent macroblocks.

7. The method of claim 3 wherein the picture frame is a CCIR 601 frame having 720 pixels by 480 scan lines partitioned into 1350 macroblocks, each macroblock corresponds to a 16 by 16 block of Y data samples, an 8 by 8 block of Cb data samples and an 8 by 8 block of Cr data samples, the memory includes a plurality of 1 kilobyte memory pages, and the dividing step comprises dividing the 720 by 480 Y matrix into 12 columns by 30 rows of non-overlapping rectangular tiles, the majority of the rectangular tiles having Y data samples corresponding to 4 adjacent macroblocks.

8. The method of claim 4 wherein the picture frame is a CCIR 601 frame having 720 pixels by 480 scan lines partitioned into 1350 macroblocks, each macroblock corresponds to a 16 by 16 block of Y data samples, an 8 by 8 block of Cb data samples and an 8 by 8 block of Cr data samples, the memory includes a plurality of 1 kilobyte memory pages, and the dividing step comprises dividing the 720 by 240 interleaved Cb/Cr matrix into 6 columns by 32 rows of non-overlapping rectangular tiles, the majority of the rectangular tiles having Cb and Cr data samples corresponding to 8 adjacent macroblocks.

* * * * *